H. TERHUNE.
DROP HAMMER.
APPLICATION FILED OCT. 17, 1908.

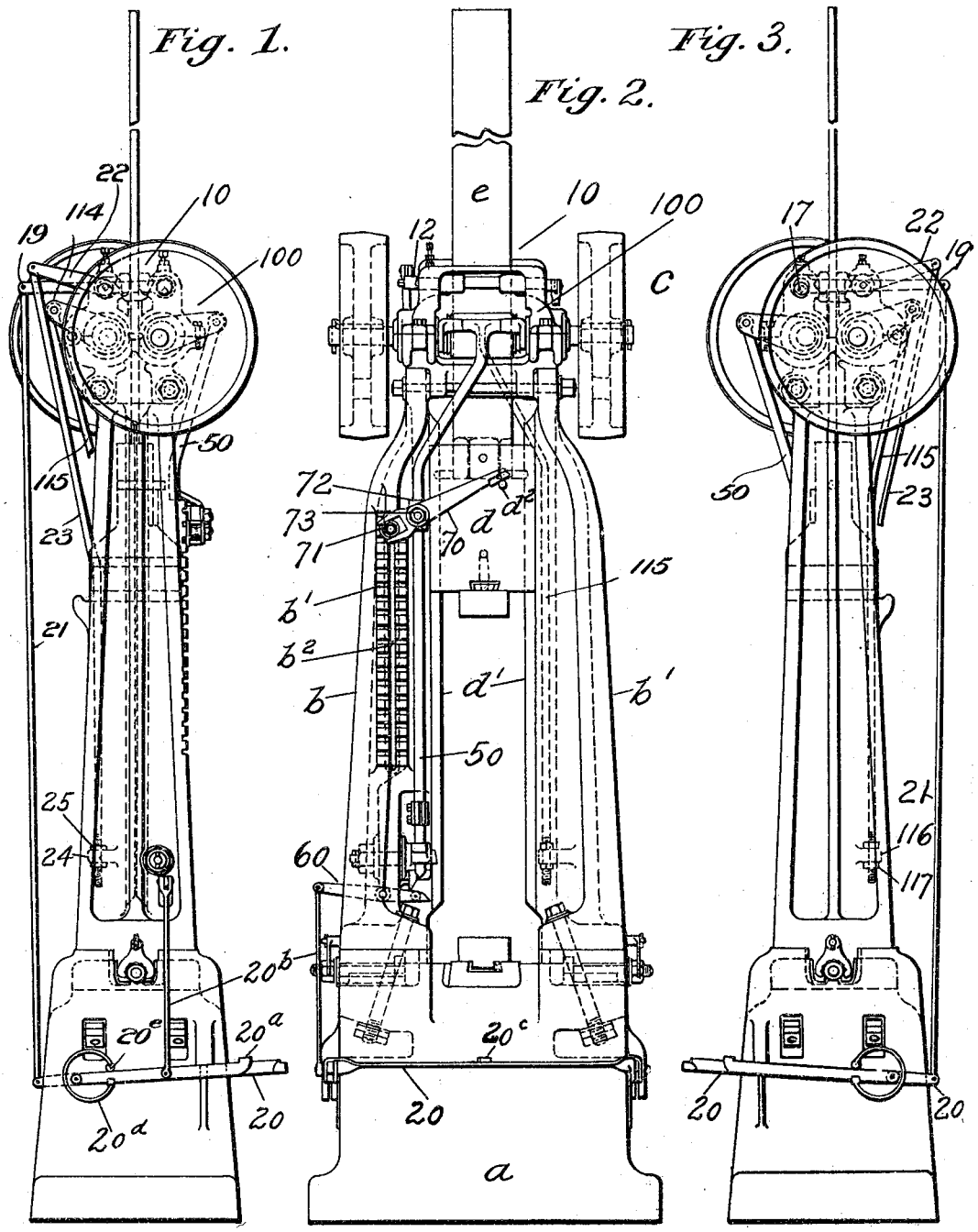

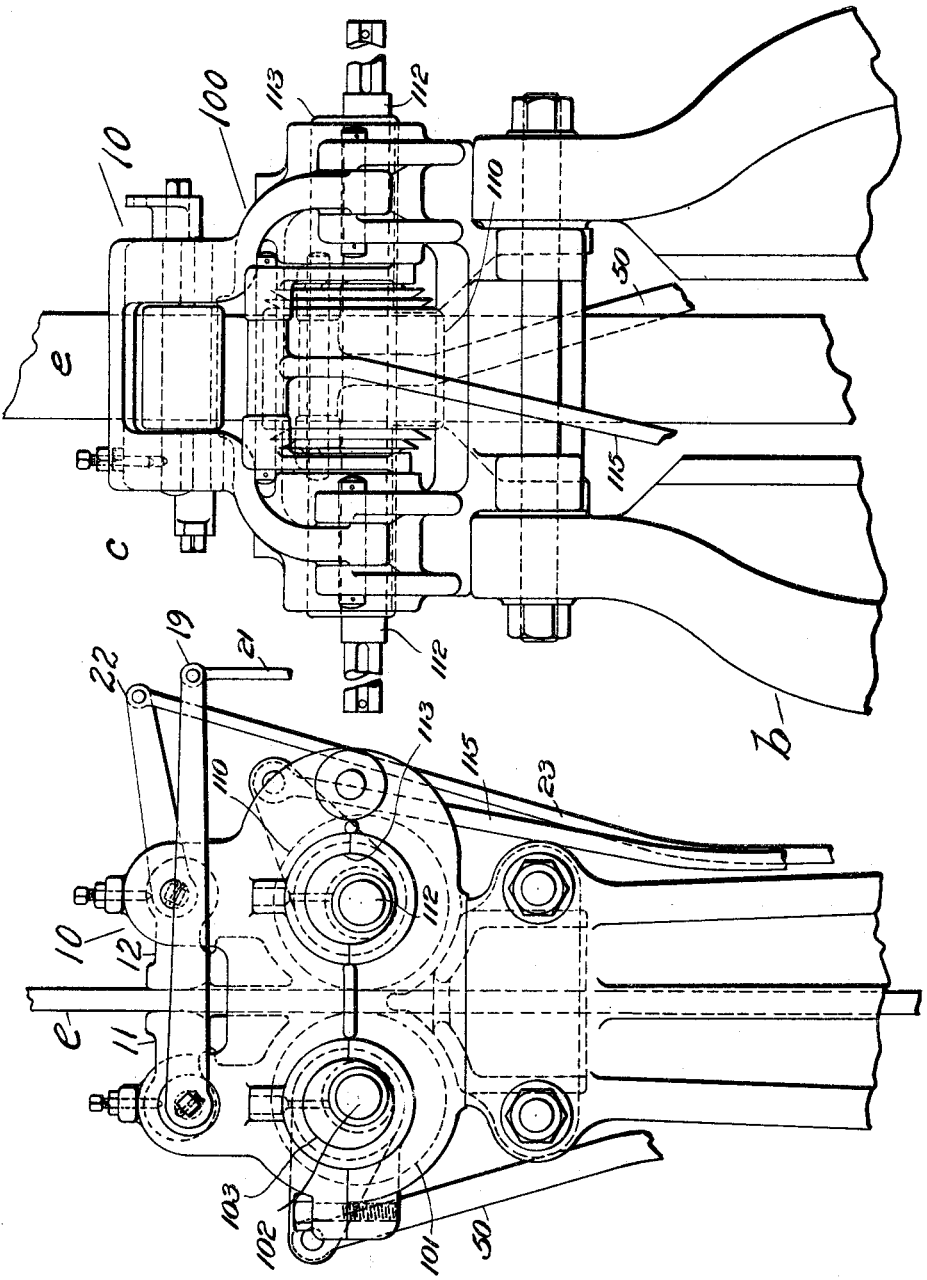

1,051,779.

Patented Jan. 28, 1913.
6 SHEETS—SHEET 3.

WITNESSES:

INVENTOR.
Howard Terhune
BY
his ATTORNEY.

H. TERHUNE.
DROP HAMMER.
APPLICATION FILED OCT. 17, 1908.
1,051,779.
Patented Jan. 28, 1913.
6 SHEETS—SHEET 4.
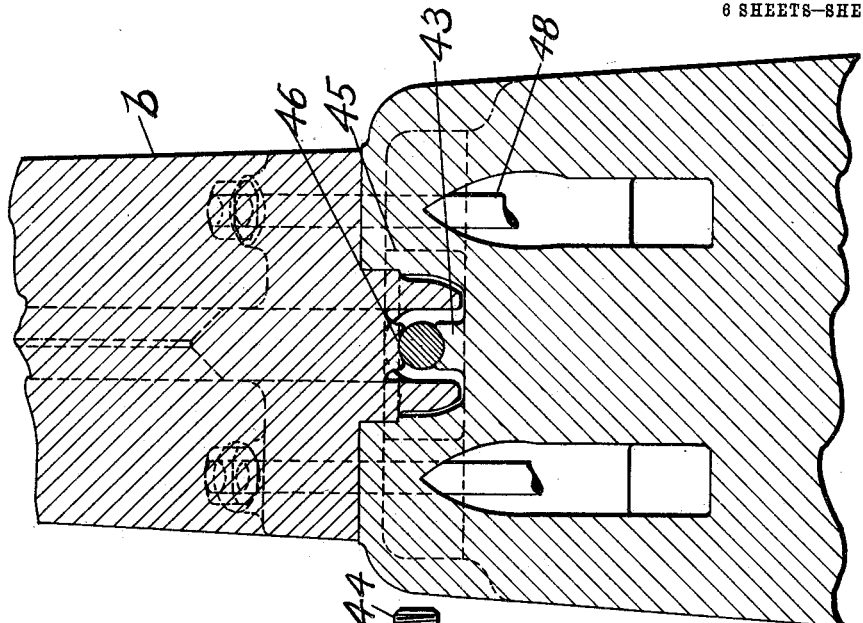
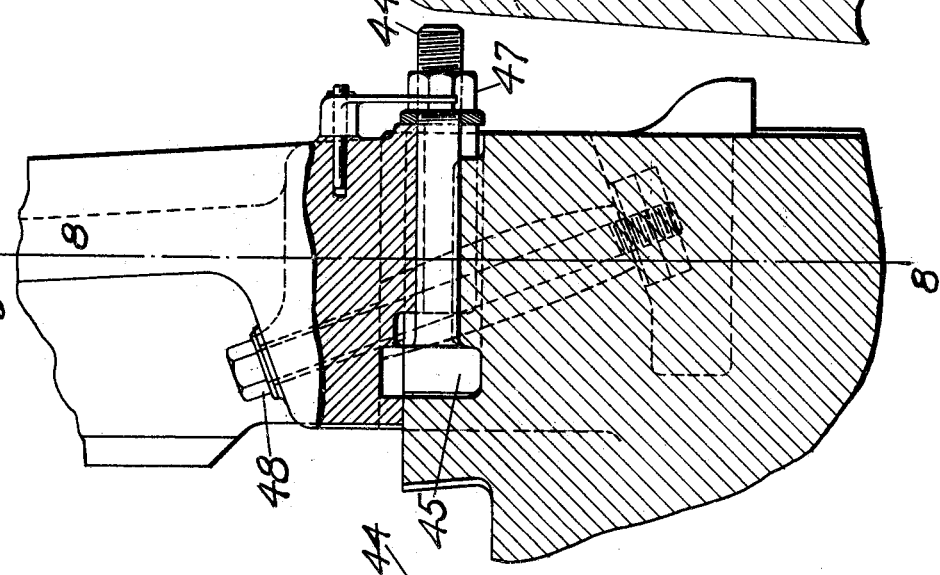
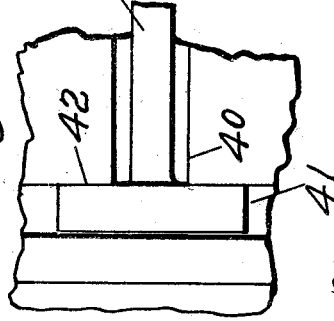
WITNESSES:
INVENTOR.
Howard Terhune
BY
N. E. Hart
his ATTORNEY.

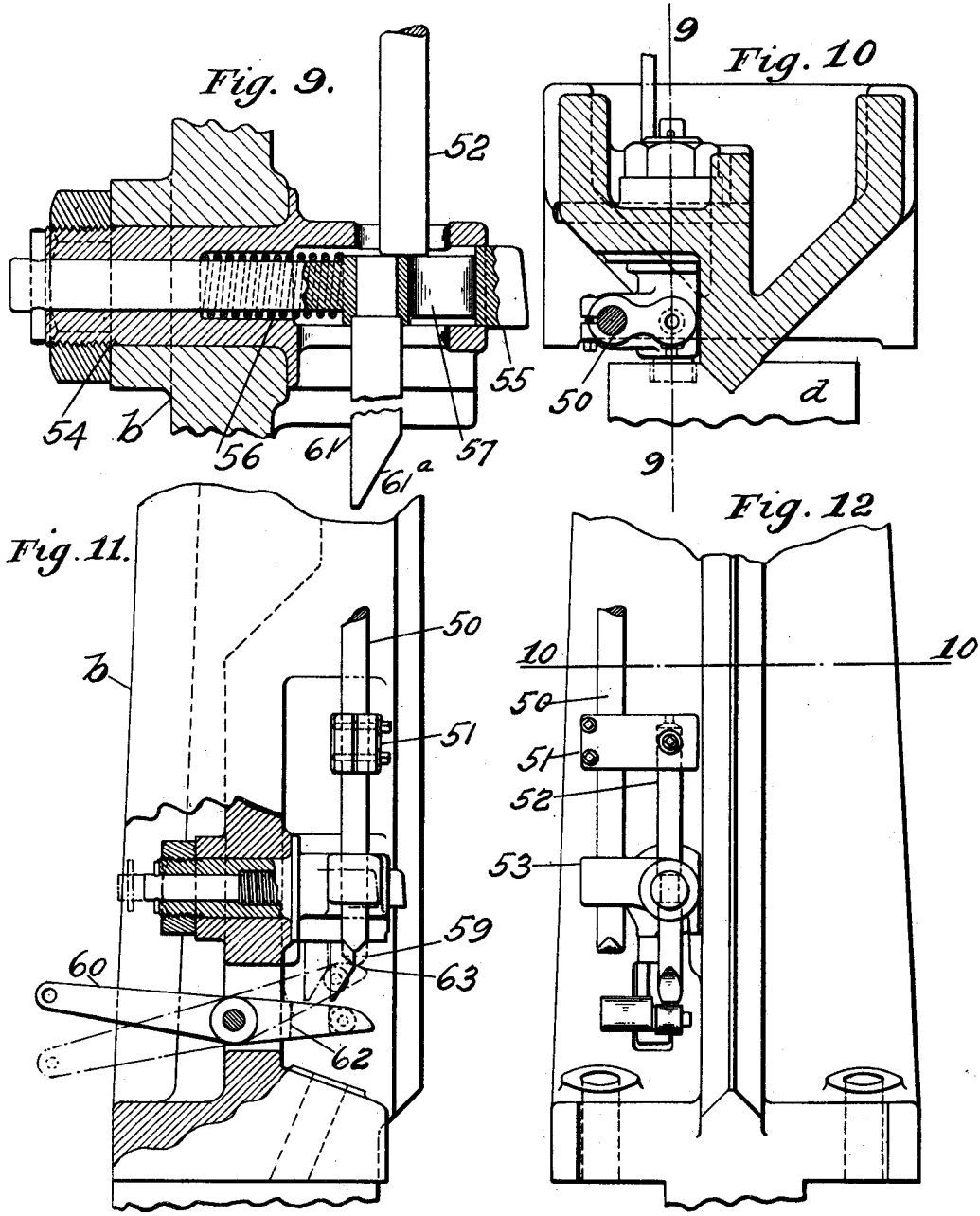

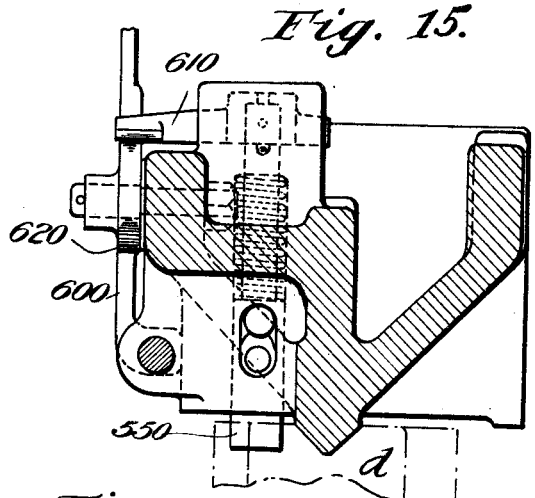
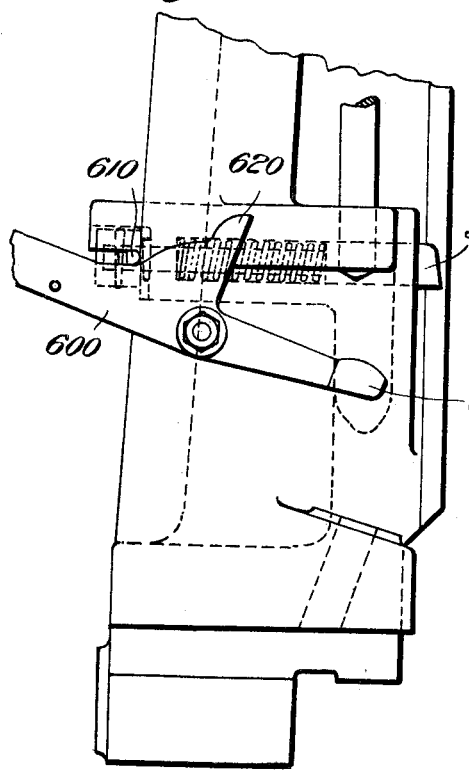
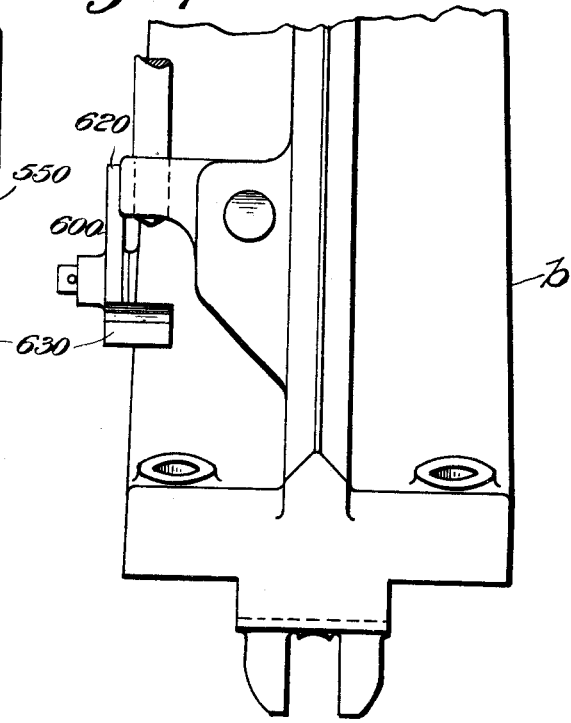

UNITED STATES PATENT OFFICE.

HOWARD TERHUNE, OF HARTFORD, CONNECTICUT.

DROP-HAMMER.

1,051,779.  Specification of Letters Patent.  Patented Jan. 28, 1913.

Application filed October 17, 1908. Serial No. 458,178.

*To all whom it may concern:*

Be it known that I, HOWARD TERHUNE, a citizen of the United States, and a resident of Hartford, in the county of Hartford and State of Connecticut, have invented certain new and useful Improvements in Drop-Hammers, of which the following is a specification.

My invention relates to improvements in drop presses, the object of the invention being to improve the construction of machines of this class in a number of different particulars, more especially in respect to the adjustment of the board-clamp, the adjustment of the hammer-raising rolls, the securing and adjustment of the side uprights to the base, and providing a novel manner of cutting out the automatic actuation of the hammer and controlling its movement by the foot of the operator; also in the provision of a novel form of adjustment for the roll-releasing lever.

Figure 6:
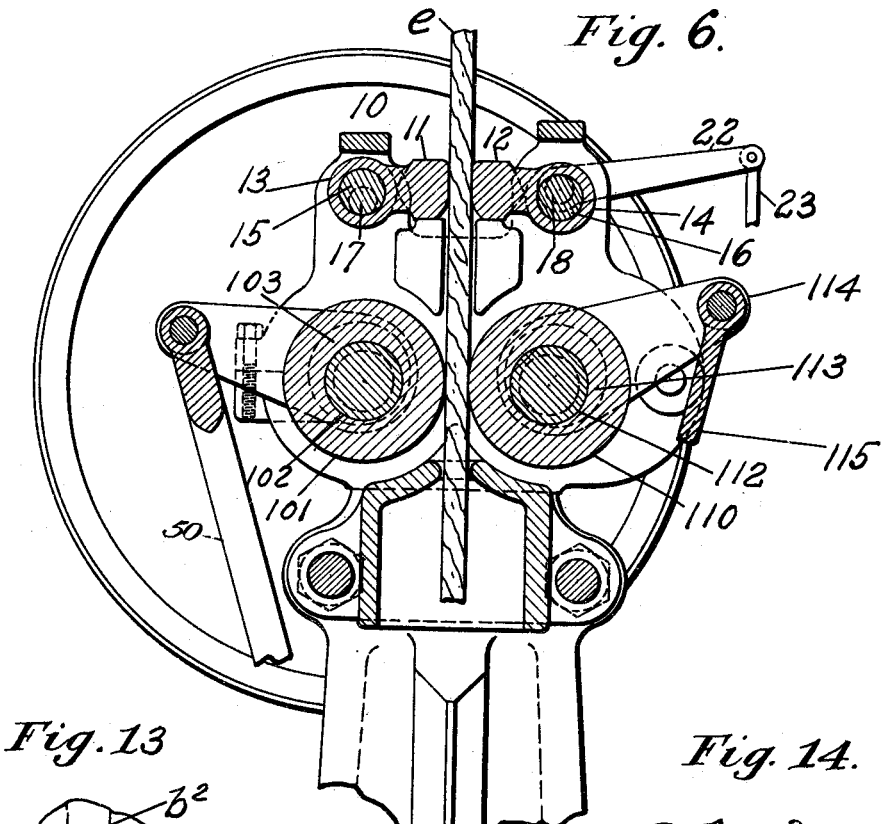
Figure 13:
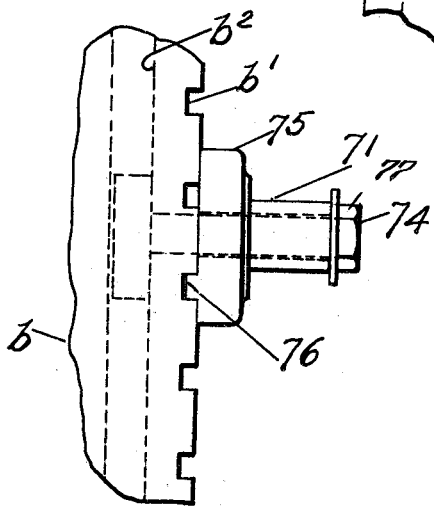
Figure 14:
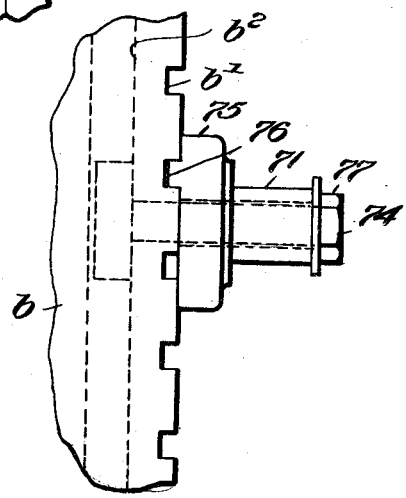

In the drawings—Figure 1 is a side elevation of a drop hammer in which my invention are embodied, looking from the left of Fig. 2. Fig. 2 is a front view of a drop hammer. Fig. 3 is a side view of the same looking from the right of Fig. 2. Fig. 4 is a detail view on enlarged scale of the head of a drop hammer. Fig. 5 is a detail rear view on enlarged scale of the head. Fig. 6 is a sectional side elevation of the head. Fig. 7 is a side elevation partly in section showing the attachment of the side upright to the base. Fig. 7^A is a plan view of the base showing the T-shaped recesses. Fig. 8 is a sectional view on the line 8—8 of Fig. 7. Fig. 9 is a sectional view on the line 9—9 of Fig. 10 showing the knock-off plug. Fig. 10 is a sectional plan view on the line 10—10 of Fig. 12. Fig. 11 is a detail side elevation on enlarged scale of one of the uprights showing the friction-bar controlling mechanism, parts being broken away to show construction. Fig. 12 is a front view of the parts shown in Fig. 11. Figs. 13 and 14 are detail views on enlarged scale of the adjusting device for the roll-releasing lever. Fig. 15 is a sectional plan view of one of the uprights on enlarged scale illustrating a modification of the friction-bar controlling mechanism. Fig. 16 is a side elevation of the same. Fig. 17 is a view looking from the right of Fig. 16.

Referring to the drawings *a* is the base, *b b'* the uprights mounted on and secured to the base in a manner to be hereinafter described.

*c* denotes in general the head mounted on the top of the uprights, *d* the hammer sliding on guides *d'* on the inner faces of the side uprights.

*e* denotes the board to which the hammer is secured and by means of which it is raised.

10 denotes in general the board-clamp by means of which the hammer may be held in its raised position.

100 denotes in general the hammer-raising mechanism which comprises rolls movable toward and away from each other, and adapted to engage the board *e* to raise the hammer in the usual manner.

Referring now more particularly to Figs. 1, 2, 3, 4, 5 and 6 of the drawings I desire to call attention to one feature of my invention, namely, the means which I have provided for adjusting the board-clamp. As will be seen the board-clamp is arranged above the raising rolls. It comprises in detail a pair of clamping members 11, 12, provided with hubs, 13, 14, which fit eccentrics 15, 16 on shafts 17, 18. To the shaft 17 there is connected a lever 19 which is connected with the treadle 20 by the bar 21. As will be seen, when the treadle is pressed down the eccentric is rotated, moving the clamp 11 away from the clamp 12, releasing the board so that the hammer may drop in the well known manner. To the shaft 18 on which the eccentric 16 is mounted a lever 22 is secured having connected to its end an adjusting bar 23 which passes down to the rear of one of the side uprights, (the left hand upright looking from the front of the machine), with its end passing through a lug 24, nuts 25 being threaded onto said bar 23 above and below said lug 24 in order to provide for adjusting the bar. These board-clamps have a heavy duty to perform as they must grip the board with sufficient force to sustain the weight of the hammer when the machine is being operated by the treadle. It often becomes necessary to adjust these clamps so that they will grip just the board firmly. These boards vary in width from seven to twelve inches and it is, important that the clamps shall always be parallel with each other so that they will get an even grip on the board throughout its width, rather than a heavy grip at one side and a light grip at the other side, which tends to splinter the board and damage it. Heretofore the clamps have been adjusted by set screws. There are various objections to this method of adjustment; first, for the reason that it is very difficult to get an even adjustment, and second, for the reason that it is necessary to climb to the top of the machine in order to accomplish the adjustment.

With my eccentric adjustment the face of the clamp 12 is always maintained in parallelism with the base of the clamp 11 and the adjustment of the clamps can be readily accomplished from the floor by manipulation of the nuts 25 or some equivalent device. The eccentric 15 is used solely for moving the clamp 11 back to release the board and allow the hammer to drop, it being operated by the treadle 20 as described. The eccentric 16 is utilized to adjust the clamp 12 toward and away from the clamp 11 to vary the gripping effect of the clamps on the board. It is also often necessary to adjust the raising-rolls toward or away from each other and I accomplish this in a manner similar to the adjustment of the clamps. The rolls are indicated at 101, 110, mounted on shafts 102, 112, which shafts are mounted in eccentric bushings 103, 113. The roll 101 is actuated by the friction bar 50 in the usual manner for automatically raising the hammer after it has dropped. The roll 110 is the roll which is adjusted toward or away from the roll 101, the eccentric 113 having secured to it a lever 114 having attached to its end a bar 115 which extends down at the rear of the right hand upright (looking from the front of the machine), its end passing through a lug 116, adjusting nuts 117 being threaded onto the bar above and below said lug in order to lock the bar, lever and roll 110 in adjusted position. This eccentric adjustment for the roll insures that it is moved bodily toward and away from its coöperating roll 101 and if the rolls are originally set up in parallelism they are retained in that position in any position of adjustment. The adjustment of the rolls can also be effected readily from the floor by the manipulation of the adjusting nuts 117, making a very convenient and accurate adjustment.

Referring now to Figs. 7, 7ᴬ and 8 the manner of adjusting the side uprights on the base will be seen. The drawings indicate one side upright and the same arrangement is applied to both. The device will be described with reference to one side upright only. As seen in the plan view of Fig. 7ᴬ the top of the base under the side upright is grooved as at 40, this groove being enlarged at its inner end as at 41 forming shoulders 42. As seen in Figs. 7 and 8 there is an upstanding rib 43 centrally in this groove. A bolt 44 has an enlarged head 45 which fits in the enlargement 41 of the groove and rests against the shoulders 42. This bolt is supported on the rib 43. The upright rests on the base as indicated and has tongues which fit down into the groove 40, straddling the bolt, and a depending rib 46 which rests on the bolt. The bolt extends outside of the base and is provided with a nut 47 which bears against the side of the upright. The usual base-binding bolts 48 pass through the upright into the base in order to hold the upright back against the nut 47. The strain to which these uprights are subjected due to the blow of the hammer is exerted on the nut 47 and transferred to the head of the bolt 45 which engages the shoulders 42 in the base. It will be seen that the bolt 44 is always under tension, which prevents any upsetting or jamming or breaking of any fitted part inside of the base, as very often happens in the adjusting devices which are at present used.

I have illustrated a usual form of friction-bar by which one of the raising rolls is thrown into and out of engagement with the board. This friction-bar is indicated at 50 and is connected at its upper end with one of the rolls 101, which roll can swing so as to be engaged with or disengaged from the board $e$. When the friction-bar is in its raised position the roll is disengaged from the board; when the friction-bar drops it throws the roll into engagement with the board, and this roll with its coöperating roll 110 grips the board and raises the hammer. When the hammer reaches its top position the pin $d^2$ engages the end of the roll-releasing lever 70, raising the friction-bar and swinging the roll 101 away from the board; the clamps 10 hold the hammer in raised position. The friction-bar 50 and the stop-pin 52, which is secured to the friction-bar by the dog 51, are raised sufficiently to permit the knock-off plug 55 to be thrown forward under the end of the stop-pin, as illustrated in Fig. 9, thus holding the friction-bar in raised position. When the clamps 10 are released by pressure on the main treadle 20 the hammer drops and at the proper moment strikes the end of the knock-off plug 55, driving it rearwardly until the opening 57 through the plug comes under the stop-pin 52. This permits the friction-bar and stop-pin to drop, which throws the roll 101 into engagement with the board and causes the raising of the hammer.

These hammers can be operated either to give single blows, or by holding down the main treadle 20 to give continuous blows and by arranging the machine so that the clamps 10 and the friction-bar are under the direct control of the operator any number of blows of varying force can be used and it is possible with a hammer weighing many hundred pounds to strike very light blows and to graduate the force and frequency of the blows in any way desired. I have provided a novel mechanism for such a direct control of the hammer by the operator. In Figs. 1, 2 and 3 the general application of this device to a hammer is illustrated and it will be seen from an examination of these figures that in addition to the main treadle 20, which operates the clamps 10, I utilize an auxiliary treadle 20ᵃ which controls the friction-bar. This treadle 20ᵃ is shorter than the main treadle 20; its front bar overlies the main treadle so that if desired the main treadle can be moved without moving the auxiliary treadle. The auxiliary treadle has a projection 20ᶜ from its front bar which overlies the front bar of the main treadle 20 so that the operator by placing his foot on this projection 20ᶜ can operate both treadles in unison, the spring 20ᵈ secured at one end to a stud 20ᵉ and with its other end bearing against the under side of the main treadle 20 returning them in unison to their normal positions. This auxiliary treadle 20ᵃ is connected by the link 20ᵇ with a lever 60 which is pivoted in the upright, as more clearly appears in Fig. 11 of the drawings. Referring now to Figs. 9, 10, 11 and 12, it will be seen that the knock-off plug has a depending stud 61 with a beveled surface 61ᵃ. The forward end of the lever 60 is apertured as at 62 to receive this stud 61, one side of this aperture engaging the beveled face 61ᵃ of the stud so that when the auxiliary treadle 20ᵃ is pressed down the forward end of the lever 60 is raised and the knock-off plug 55 is forced rearwardly so that the friction-bar 50 and stop-pin fall until the end 59 of the friction-bar rests on the end 63 of the lever, as indicated in the dot-and-dash lines in Fig. 11.

In the normal operation of the machine the hammer is held in raised position by the board clamps and the raising rolls are rocked apart by the eccentric mounting of one of them which is connected with the friction-bar, the friction-bar being held in raised position by reason of the fact that the stop-pin attached to its lower end rests on the knock-off plug. When it is desired to drop the hammer the treadle 20 is pressed down, releasing the board clamps. As the hammer descends it strikes the knock-off plug, moving it to one side so as to allow the stop-pin and friction-bar to drop; the weight of this friction-bar throws the raising rolls into engagement with each other so that they engage the board and raise the hammer. When the friction-bar drops the outer end of the roll-releasing lever drops with it. The friction-bar remains in its dropped position while the hammer is being raised and until the pin $d^2$ on the hammer engages the end of the roll-releasing lever 70. This raises the friction-bar and allows the knock-off plug to be thrown to the right by its spring until it comes under the stop-pin. The raising of the friction-bar of course separates the rolls and the board clamps take hold of the board and hold it in raised position. It is evident therefore that without the devices last above described the hammer must move up until the pin $d^2$ engages the end of the roll-releasing lever 70 in order to raise the friction-bar before is can be dropped again. But by providing the mechanism last above described and the use of the two treadles it is seen that one of the treadles 20ᵃ holds the knock-off plug to the rear and allows the entire weight of the friction-bar to be constantly carried by the lever 60 while the treadle 20 controls the board clamps. It is evident therefore that the operator can move the raising rolls apart and so disengage them from the board at any point he desires merely by pressing the treadle 20ᵃ, which raises the friction-bar; and by operating the treadles 20ᵃ and 20 together when they are in raised position it is clear that the friction-bar is dropped to cause the hammer to be raised. When the hammer is to be dropped both treadles are pressed down, treadle 20ᵃ raising the friction-bar so as to disengage the raising rolls from the board, and treadle 20 disengaging the board clamps from the board, leaving the hammer entirely free to fall. It will be seen from this description that the operator has entire control of the hammer by means of these two treadles which he operates with one foot, and he can manipulate the hammer to strike any kind of a blow he desires merely by moving the treadles in unison.

The construction is very simple and very effective in its operation. The desired result is accomplished entirely with one foot, leaving the operator's hands free to perform other duties.

As has been described hereinabove the raising rolls are disengaged from the board by the pin $d^2$ on the hammer which engages the end of the roll-releasing lever 70. It is desirable to provide an adjustment of the position of this roll-releasing lever so that the hammer can be raised to any height. By reference to Fig. 2 it will be seen that this lever 70 is fulcrumed on a stud 71 which is secured to one of the uprights, and has a sleeve 72 through which the friction-bar passes and a set-nut 73 by which the lever is secured to the friction-bar. I have provided a novel form of adjustment for the stud 71 which permits of a comparatively close adjustment, the device being illustrated in detail in Figs. 13 and 14. The upright $b$ is transversely grooved as at $b'$ and has a T-slot $b^2$ in which the head of the bolt 74 is located. On this bolt is located the stud 71 having a base 75 having a projection 76 from its rear side which is adapted to fit in the transverse grooves *b'* in the upright. This stud is held on the bolt 74 in any suitable way, as by the nut 77, and can be turned on the bolt so as to cause the projection 76 to engage the groove which is above or below the stud.

Fig. 13 shows the projection 76 in engagement with a groove below the stud while Fig. 14 shows it in engagement with a groove above the stud. By making this stud rotatable on the bolt I am enabled to get a much finer adjustment than is at present possible.

Figs. 15, 16 and 17 show a modification of the devices illustrated in Figs. 9, 10, 11 and 12, for holding the knock-off plug to the rear while the hammer is being controlled by the two treadles 20, 20ᵃ. To the rear of the knock-off plug 550 is secured a laterally extending pin 610 which is adapted to be engaged by a cam surface 620 projecting from the lever 600. The forward end 630 of the lever being shaped to receive the end of the friction bar the results obtained are substantially the same as with the devices shown in Figs. 9 to 12, inclusive, but the construction is much simpler and at the present time a preferred form.

I am aware that the inventions as described herein are subject to modifications and alterations in details and I desire to include herein all such modifications as come within the scope of the claims.

I claim:

1. In a drop hammer a base, side uprights located thereon, T-shaped recesses in each base under said side uprights, a bolt having its head located in the enlarged part of each recess, tongues on each upright straddling each bolt, and a nut threaded onto the end of each bolt and bearing against the side of said upright.

2. In a drop hammer a base, side uprights located thereon, T-shaped recesses in said base beneath said uprights, a bolt having its head located in the enlargement in each recess, an upstanding rib to support the body of each bolt, depending tongues on said upright straddling said bolts, a depending rib on each upright engaging the body of each bolt, and a nut threaded onto the end of said bolt and engaging the side of each upright for the purpose of adjusting said uprights transversely of the base, substantially as described.

3. The combination with the knock-off plug and friction bar of a drop hammer mechanism, of a lever having operative engagement with said knock-off plug to hold it in its rearward position, the forward end of said lever constructed and arranged to raise said friction-bar, and a treadle connected with said lever for operating the same, substantially as described.

4. In a drop hammer the frame transversely grooved and having a T-slot, a bolt whose head slides in said T-slot, a stud rotatably mounted on said bolt, a projection from the rear of said stud displaced axially and adapted to engage said transverse grooves, means for clamping said bolt in any desired position of adjustment, and a roll-releasing lever fulcrumed on said stud.

HOWARD TERHUNE.

Witnesses:
V. C. BILLINGS,
WM. P. LARAWAY.

Copies of this patent may be obtained for five cents each, by addressing the "Commissioner of Patents, Washington, D. C."